Nov. 17, 1942.   E. STRASSENBURG   2,302,401
PHOTOGRAPHIC SHUTTER
Filed Jan. 19, 1940   2 Sheets-Sheet 1
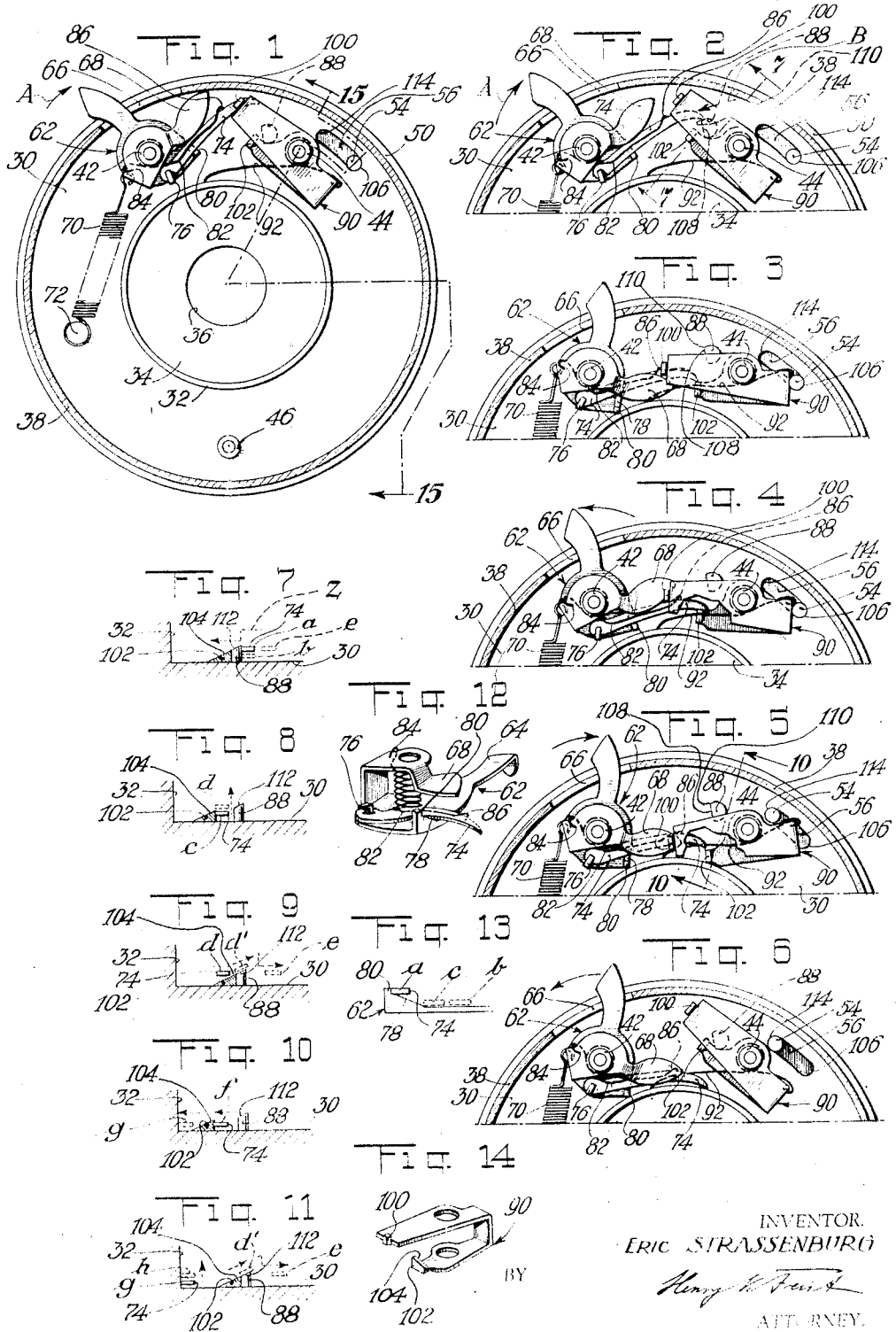
INVENTOR.
ERIC STRASSENBURG
BY
ATTORNEY.

Nov. 17, 1942.   E. STRASSENBURG   2,302,401
PHOTOGRAPHIC SHUTTER
Filed Jan. 19, 1940   2 Sheets-Sheet 2
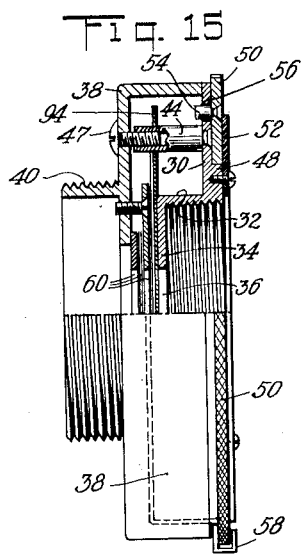
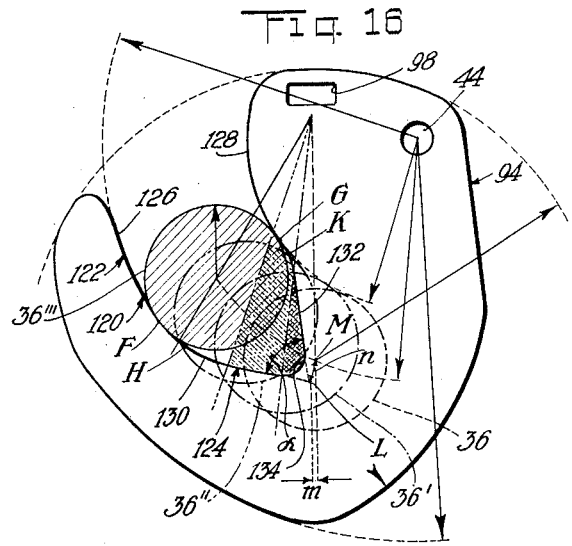
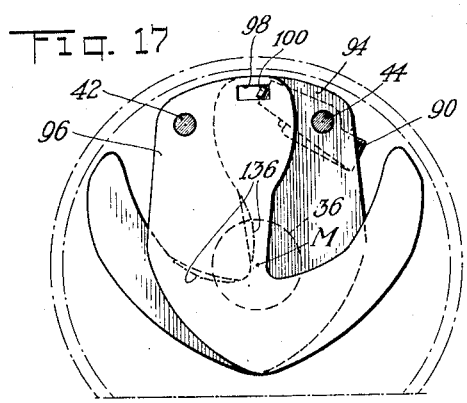
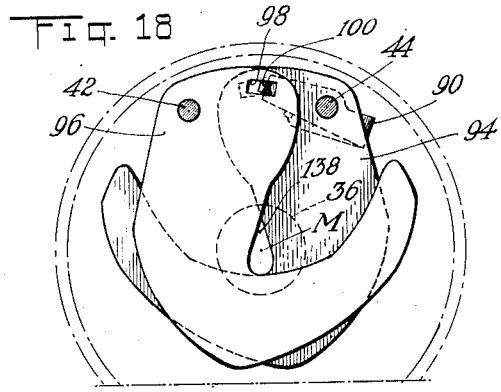
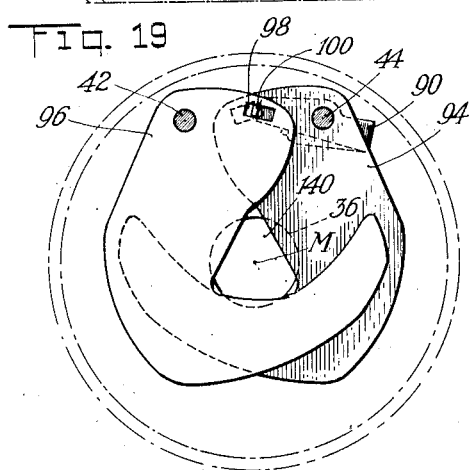
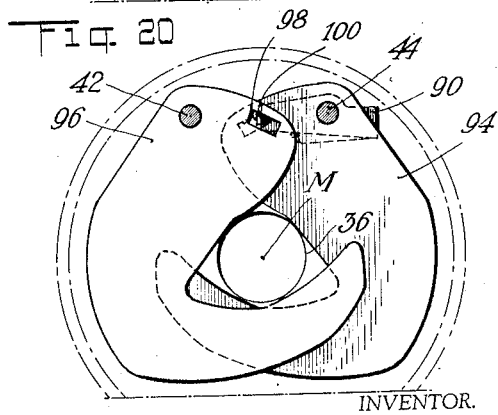
INVENTOR.
ERIC STRASSENBURG
BY
ATTORNEY.

Patented Nov. 17, 1942

2,302,401

UNITED STATES PATENT OFFICE 2,302,401

PHOTOGRAPHIC SHUTTER

Eric Strassenburg, New York, N. Y., assignor to Histra Corporation, New York, N. Y.

Application January 19, 1940, Serial No. 314,578

12 Claims. (Cl. 95—62)

My invention relates to photography, and more particularly to photographic shutters.

One object of my invention is to provide a shutter of simple construction having only three main elements in the actuating mechanism.

Another object of my invention is to provide a shutter in which the actuating mechanism has only two pivots and these pivots may be used for the swingable mounting of the shutter blades and for the connection of the mounting plate with the casing.

A further object of my invention is to provide a simple two-blade shutter with a "bulb" exposure and an "instantaneous" exposure.

In order to carry out my invention, I provide a photographic shutter comprising shutter blades, a pivoted blade carrier for operating said shutter blades, a first spring connected to said blade carrier for returning same into its normal position to hold the shutter blades in closing position, a pivoted trigger, a second spring connected to said trigger for returning same into its normal inactive position, a spring pressed actuator, said actuator being movably connected with said trigger and being disengaged from said blade carrier when the trigger is in its normal inactive position, said actuator being adapted to be brought into engagement with said blade carrier, stationary means in the path of said actuator for causing a relative movement between the trigger and the actuator to tension the spring of said actuator during the movement of the trigger into active position, and means for releasing the spring pressed actuator for an engagement with the blade carrier so as to actuate same.

The above mentioned objects and advantages as well as other objects and advantages will be more fully disclosed in the following specification reference being had to the accompanying drawings forming part of this specification, in which:

Fig. 1 is a rear end view of the shutter, the shutter blades and the casing usually closing the shutter being partly removed to show the parts of the shutter mechanism in normal inactive position, Fig. 2 is a fragmentary rear end view of the shutter adjusted for "bulb" exposure, the parts of the shutter mechanism being in a position in which the trigger is in an intermediate advancing position and the actuating lever is held in a position to tension its spring, Fig. 3 is a fragmentary rear end view of the shutter adjusted for "bulb" exposure, the parts of the shutter mechanism being in a position in which the trigger is in its active end position and the blade carrier is held in the position for open shutter blades, Fig. 4 is a fragmentary rear end view of the shutter adjusted for "bulb" exposure, the parts of the shutter mechanism being in a position in which the trigger is in an intermediate returning position and the actuating lever is in a position to become disengaged from the blade carrier, Fig. 5 is a fragmentary rear end view of the shutter adjusted for "instantaneous" exposure, the parts of the shutter mechanism being in a position in which the trigger is in its active end position and the actuating lever is in a position to become disengaged from the blade carrier, Fig. 6 is a fragmentary rear end view of the shutter adjusted for "instantaneous" exposure, the parts of the shutter mechanism being in a position in which the trigger is in its active end position and the blade carrier disengaged from the actuating lever is in its normal position to hold the shutter blades in closing position, Fig. 7 is a somewhat diagrammatical sectional view, taken on line 7—7 of Fig. 2, illustrating the position of the actuating lever and the blade carrier shortly before the blade carrier is actuated by the actuating lever, Figs. 8 and 9 are diagrammatical illustrations similar to that shown in Fig. 7, in which, however, the parts of the shutter mechanism are in different positions occupied during the "bulb" exposure, Fig. 10 is a somewhat diagrammatical sectional view taken on line 10—10 of Fig. 5, illustrating the position of the actuating lever and the blade carrier shortly before their disengagement, Fig. 11 is a diagrammatical illustration similar to that shown in Fig. 10, in which, however, the parts of the shutter mechanism are in a different position occupied during the "instantaneous" exposure, Fig. 12 is a perspective view of the trigger with the spring pressed actuating lever hinged thereto, Fig. 13 is a fragmentary side end view of the trigger with the actuating lever in section, Fig. 14 is a perspective view of the blade carrier, Fig. 15 is partly a side end view and partly a cross-sectional view of the shutter taken on line 15—15 of Fig. 1, some parts of the shutter being omitted for the sake of clarification, Fig. 16 is a plan view of a shutter blade in enlarged scale, Fig. 17 is a plan view of the shutter blades in closing position, Figs. 18 and 19 are plan views of the shutter blades in various intermediate opening positions, and Fig. 20 is a plan view of the shutter blades in fully opened position.

Referring now to the drawings, 30 indicates a mounting plate carrying the mechanism of the shutter. Said mounting plate has a cylindrical center portion 32 (Figs. 1 and 15) with a screw-threaded inner surface for the reception of the lens mounting. The bottom 34 of the cylindrical portion 32 is provided with the light admitting aperture 36. The casing 38 of the shutter has a screw-threaded collar 40 for engagement with the camera. Three hollow studs 42, 44 and 46 are rigidly secured to the mounting plate 30 in any suitable manner. Said studs have an inner screw-threaded surface, and the casing 38 is connected to the mounting plate 30 by means of screws 47 screwed into said studs. The mounting plate 30 has a shoulder 48 (see Fig. 15) at its outer surface. A ring 50 of the setting mechanism for "bulb" and "instantaneous" exposures is slidably mounted on said shoulder 48. A facing plate 52 screwed to the outer surface of the mounting plate 30 holds the ring 50 in its position. A stop pin 54 secured to the ring 50 is in slidable engagement with a curved slot 56 of the mounting plate 30. A pointer 58 projecting from the casing 38 forms a part of a usual iris diaphragm mechanism 60.

A trigger 62 is swingably mounted on the stud or pivot 42. A lever 64 of the trigger projects from the casing of the shutter through a slot 66 for manual operation of the trigger. A lug 68 of the trigger may serve as an abutment for cooperation with the end of a conventional wire release (not shown in the drawings). A spring 70 stretched between the trigger 62 and a pin 72 secured to the mounting plate tends to draw the trigger into its normal inactive position shown in Fig. 1.

An actuating lever 74 is pivotally connected to the trigger 62 by means of a hook 76 or the like secured to the trigger at an eccentric point thereof. As best shown in Fig. 12, the length of the shaft of the hook is somewhat larger than the thickness of the actuating lever 74. Thus, the actuating lever 74 may be rotated about the shaft of the hook 74 and/or may be moved relatively to the base of the trigger 62 with its pivoted end sliding along the shaft of the hook or tilting about the same. The trigger 62 has a cam-like surface 78 and an abutment 80 cooperating with said actuating lever 74. A cylindrical spiral spring 82 is wound around the pivot 42. One end 84 of said spring 82 is engaged with the body of the trigger, and the other end 86 of said spring is engaged with the actuating lever 74 in such a manner, that the spring urges the actuating lever 74 against the cam 78 and against the abutment 80. In the normal inoperative position of the trigger 62 shown in Fig. 1 the actuating lever 74 is held against the abutment 80 by the spring 82 and its main body is at a certain distance from the base of the trigger as shown in solid lines in Fig. 13. The spring 82 urging the actuating lever 74 against the abutment 80 provides for a joint movement of the trigger and the actuating lever as long as the actuating lever is not arrested by a post 88 secured to the mounting plate 30. The cooperation between the post 88 and the actuating lever 74 will be described in connection with the description of the operation of the shutter.

A blade driving means or blade carrier 90 is swingably mounted on the stud or pivot 44. One end of a cylindrical spiral spring 92 wound around the pivot 44 abuts against the wall of the center portion 32 of the mounting plate 30 and the other end of said spring 92 is engaged with the blade carrier 90. The spring 92 tends to draw the blade carrier 90 against the post 88 into its normal position to hold the shutter blades 94 and 96 in closing position as shown in Fig. 17. The shutter blade 94 is swingably mounted on the pivot 44 of the blade carrier 90 and rests on the upper arm thereof. The shutter blade 96 is swingably mounted on the pivot 42 of the trigger. Each of the shutter blades 94 and 96 is provided with a slot 98, and a lug 100 arranged at the upper arm of the blade carrier 90 is in engagement with the slot 98 of both shutter blades, so that the shutter blades are interlocked with each other and are moved when the blade carrier is rotated about its pivot. As best shown in Fig. 14, the lower arm of the blade carrier 90 is provided with an abutment 102 having an inclined upper surface 104. Said abutment 102 cooperates with the free end of the actuating lever 74 as will be described hereinafter.

The operation of the shutter is as follows:

*Bulb-exposure*

The setting mechanism is set for "bulb"-exposure. For this purpose the ring 50 is rotated about the shoulder 48 into a position, in which the stop 54 contacts the right hand end 106 of the slot 56 as shown in Figs. 1 to 4. Then, the trigger 62 is rotated in the direction of the arrow A (Fig. 1) about its pivot 42 against the action of the spring 70. The actuating lever 74 joins the movement of the trigger, until it abuts against the post 88 which is in the path of the actuating lever 74. Now, the actuating lever 74 is arrested, and, during further rotation of the trigger 62 in the direction of the arrow A, a relative movement between the trigger and actuating lever occurs, as the actuating lever 74 is rotated about the shaft of the hook 76. Said rotation of the actuating lever causes a tensioning of its spring 82. At the moment of contact between the actuating lever 74 and the post 88, the actuating lever is in the elevated position *a* as shown in Figs. 7 and 13. When during the continued rotation of the trigger 62 the actuating lever 74 is rotated about the shaft of the hook 76 as described above, the spring 82 urges the actuating lever downward against the cam 78 and thereinafter against the base of the trigger, so that the actuating lever riding on the inclined surface of the cam and moving along the base of the trigger is brought into the lower position *b* as shown in Figs. 7 and 13. Furthermore, the eccentric arrangement of the hook 76 on the trigger 62 causes a sliding movement of the end of the actuating lever 74 on the post 88 in the direction of the arrow B (Fig. 2). A portion of the post 88 is cut off at 108, and, as soon as the end of the actuating lever is moved past the edge 110, the actuating lever is released and is moved against the abutment 102 of the blade carrier 90 by the action of the spring 82 whereby the blade carrier 90 is actuated and is swung into the position shown in Fig. 3, in which the shutter blades are in the open position shown in Fig. 20 and the blade carrier 90 is arrested by the stop 54 of the setting mechanism adjusted for "bulb"-exposure as shown in Fig. 3. The trigger 62 is already in its active end position, in which its abutment 80 rests against the wall of the center portion 32. The actuating lever 74, however, which has been rotated about the pivot 76 during the actuation of the blade carrier 90, is not yet in contact with the abutment 80 of the trigger. The actuating lever 74 is still in engagement with the arrested blade carrier and locks the latter in the position for open shutter blades. Moreover, the actuating lever is still in a lower position as indicated by c in Figs. 8 and 13, i. e. the actuating lever has not yet been raised by the cam 78.

If it is desired to bring the shutter blades into closing position, the actuating lever 74 must be disengaged from the blade carrier 90. This effect is obtained in the following manner. As soon as the user of the shutter releases the trigger 62, the latter is rotated in counterclockwise direction by the spring 70, whereby the cam 78 cooperating with the actuating lever 74 lifts the latter into the elevated position d slightly above the highest point of the abutment 102 of the blade carrier as shown in Fig. 8. Fig. 4 illustrates the position of the elements in the shutter mechanism, in which the actuating lever is in said elevated position and is engaged by the abutment 80 of the trigger. The elevation of the actuating lever 74 causes a disengagement of said actuating lever from the blade carrier 90, and the released spring 92 of said blade carrier causes an immediate return movement of the latter into its normal position shown in Fig. 1, in which the blade carrier holds the shutter blades in closing position. On the other hand, the return movement of the trigger 62 by means of its spring 70 into its normal inactive position shown in Fig. 1 is continued. The actuating lever 74 participates in this movement of the trigger by means of the abutment 80 bearing against the actuating lever. Before the return movement of the actuating lever will be described, it may be mentioned that according to Fig. 9 the post 88 has an inclined upper surface 112 and that the level of the highest point of the post 88 is somewhat higher than the level of the actuating lever 74 in the position d. The above described Fig. 7 explains this embodiment of the post; the level of the actuating lever 74 in the position a is substantially equal to the level of the actuating lever in the position d, and, as according to Fig. 7 the post 88 must form a stop to arrest the actuating lever when the latter is advanced in the direction of the arrow Z, at least a portion of the post must be higher than the level of the actuating lever in position a or d. Now, during the return movement of the actuating lever 74 from the position d into the position e as shown in Fig. 9, the actuating lever contacts the inclined surface 112 at the lower point thereof. The inclined surface 112 tilts the actuating lever to a certain degree against the action of the spring 82 into the posidition d' and guides the actuating lever over the post 88. After the passage over the post 88 the actuating lever is returned into the level of the position d, i. e. the level of the position e is substantially equal to the level of the position d. As pointed out above, the abutment 102 of the blade carrier 90 also has an inclined surface 104, and the inclined surfaces 104 and 112 of the abutment 102 and the post 88 are in alignment with each other when the abutment 102 rests against the post 88 as shown in Fig. 9. If, for any reason the actuating lever 74 should drop to a certain degree from the level of its position d during its return movement, the inclined surface 104 leads the actuating lever 74 onto the inclined surface 112, so that the actuating lever is not caught by the lower edge of the inclined surface 112. When the elements of the shutter mechanism are returned into the position shown in Fig. 1, the shutter is ready for the next operation.

Instantaneous exposure

The setting mechanism is set for "instantaneous" exposure. For this purpose the ring 50 is rotated about the shoulder 48 into a position, in which the stop 54 contacts the left hand end 114 of the slot 56 as shown in Figs. 5 and 6. Then, the trigger 62 is rotated in clockwise direction about its pivot 42. During the first part of the "instantaneous" exposure, the movements of the elements of the shutter mechanism are the same as during the first part of the above described "bulb"-exposure, i. e. the actuating lever 74 is arrested by the post 88 for the tensioning of its spring 82 as shown in Figs. 2 and 7 and the blade carrier 90 is actuated by the actuating lever as soon as the free end thereof has been moved past the edge 110 of the post. Now, in contrast to the above described "bulb"-exposure, the stop 54 contacting the left hand edge 114 of the slot 56 does not limit the movement of the blade carrier 90, so that the latter may be swung through a larger angle into the position shown in Fig. 5. However, before the blade carrier is swung into this extreme position shown in Fig. 5, the trigger 62 has already reached its end active position with its abutment 80 contacting the wall of the center portion 32. Now, the actuating lever 74 is further rotated about its pivot 76 by the spring 82, whereby the rotation of the unobstructed blade carrier 90 is continued. Owing to the eccentric arrangement of the pivot 76, the free end of the actuating lever 74 slides along the abutment 102 of the blade carrier during said rotation of the actuating lever. As soon as the actuating lever is moved past the edge of the abutment 102, the actuating lever and the blade carrier are disengaged from each other, so that the spring 92 immediately returns the blade carrier from its extreme position shown in Fig. 5 into its normal position shown in Fig. 6, in which the blade carrier holds the shutter blades in closing position. At the same time the actuating lever 74 is moved from its position f (Fig. 10) into the position g by the action of its spring 82. In the position g the end of the actuating lever 74 rests against the wall of the center portion 32 as shown in Figs. 6 and 10. Now, when the user of the shutter releases the trigger 62, the cam 78 of the trigger lifts the actuating lever 74 from the position g into the position h as shown in Fig. 11, whereupon the actuating lever is moved above the post 88 into the starting position e as described above in connection with Fig. 9. At the end of the return movement of the trigger, the elements of the actuating mechanism are again in the position shown in Fig. 1, with the exception that the stop 54 of the setting mechanism contacts the left hand edge 114 of the slot 56. Now, the shutter is ready for the next operation.

As best shown in Figs. 16–20, the two shutter blades used in the shutter are of such a specific form, that, in an intermediate position of the shutter blades, the portion of the light admitting aperture 36 liberated by the shutter blades is of substantially triangular shape, so that the optical effect caused by the two-blade shutter is substantially the same as the optical effect caused by a usual three-blade shutter. It is emphasized, however, that, although the above described shutter mechanism is of special advantage for the use of my specific shutter blades, I do not wish to be limited to the use of the specific shutter blades shown in the drawings in connection with my new shutter mechanism; any other form of shutter blades could be used in a shutter equipped with my shutter mechanism. On the other hand, it will be understood, that shutter blades of the specific form shown in the drawings and described hereinafter may be used in shutters equipped with different types of shutter mechanisms. In other words, my invention is not restricted to the combination of the specific shutter mechanism with the specific shutter blades but is also concerned with the mechanism per se as well as with the shutter blades per se.

Fig. 16 illustrates only one shutter blade in an enlarged scale, i. e. the shutter blade 94, but it will be easily understood that the other shutter blade 96 is of identical form. Fig. 16 shows four different relative positions between the shutter blade and the light admitting aperture 36. For the sake of better illustration, the shutter blade is shown as remaining in the same position and the aperture is shown as being rotated about the pivot 44 of the shutter blade, although in the real shutter the aperture is stationary and the shutter blade is rotated about its pivot. The position 36 of the aperture indicates the closing position of the shutter blades as shown in Fig. 17, the position 36' of the aperture indicates a first intermediate opening position of the shutter blades as shown in Fig. 18, the position 36'' of the aperture indicates a second intermediate opening position of the shutter blades as shown in Fig. 19, and the position 36''' of the aperture indicates the fully opened position of the shutter blades as shown in Fig. 20.

The light controlling slot 120 of the shutter blade has an outer portion 122 and an inner portion 124. The edges 126 and 128 of the outer portion 122 of the slot are circles about the center of the pivot 44. The radial distance between the edges 126 and 128 is equal to the diameter of the aperture 36, and the edges 126 and 128 contact the circumference of the aperture at the points F and G respectively when the aperture is in the position 36''' for fully opened shutter blades. The inner portion 124 of the light controlling slot 120 has convergent edges 130 and 132 meeting each other at the theoretical apex L of the inner portion. In practice, however, the corner 134 of the inner portion 124 is slightly rounded as shown in solid lines in Fig. 16. The circular edges 126 and 128 of the outer portion 122 merge into the convergent edges 130 and 132 of the inner portion 124 at the points H and K respectively. The convergent edges 130 and 132 are substantially straight; if desired, however, they may be curved as indicated by the dash and dotted lines 136 in Fig. 17.

The shape of the inner portion 124 of the slot 120 determines the varying shapes of the portions of the aperture liberated by the two shutter blades during their opening movement. One object of my invention is to provide a two-blade shutter in which at the beginning of the opening movement of the shutter blades the portion of the light admitting aperture 36 liberated by the shutter blades has the form of a drop 138 (see Fig. 18), whereupon during the continuation of the opening movement of the shutter blades the shape of the gradually increasing liberated portion of the light admitting aperture 36 is changed to a triangle 140 or the like with the center M of the aperture 36 substantially in the middle of said triangle (see Fig. 19), until at the end of the opening movement of the shutter blades the circular aperture 36 is entirely liberated as shown in Fig. 20. A two-blade shutter with these features provides substantially the same optical effect as a hitherto usual more complicated three-blade shutter. The above described features of the two-blade shutter require a certain relationship between the position of the convergent edges 130, 132 and the pivot 44. The angle α between the convergent edges 130 and 132 is determined by the position of the points H, K and L (see Figs. 16). I have found that the best results are obtained when the points H and K are as near as possible to the circumference of the light admitting aperture in the position 36''' and when the apex L is as near as possible to the center M of the aperture in the position 36. In order to secure an absolute closing of the aperture by a slight overlapping of the blades in their closing position, I prefer to arrange the apex L at a small horizontal distance m from a vertical line drawn through the center M and at a small radial distance n from said center M. In the embodiment of the shutter blade shown in Fig. 16, the points H and K are outside the circumference of the aperture in the position 36''' for the following reasons. As has been pointed out above, the angle of rotation of the blade carrier 90 is slightly smaller for the "bulb"-exposure than for the "instantaneous"-exposure. Therefore the extreme end position of the shutter blades in "bulb"-exposure does not coincide with the extreme end position of the shutter blades in "instantaneous"-exposure. The light admitting aperture is fully opened during the "bulb"-exposure, when the convergent edges 130, 132 form tangents to the circumference in the extreme "bulb"-end-position of the shutter blade. Under these circumstances, however, the convergent edges 130, 132 cannot form tangents to the circumference of the aperture when the shutter blade is in its extreme "instantaneous"-end-position as shown in Fig. 16. Therefore, the points H and K are outside the circumference of the aperture in Fig. 16. Of course, if the shutter blades are used in a shutter equipped with a different type of a shutter mechanism, in which the shutter blades reach the same end position for all types of exposures, the points H and K may be positioned on the circumference of the aperture in the position 36''', so that the edges 130 and 132 form tangents to the circumference of the aperture in this position.

If desired, the apex L may be arranged at any other point within the boundary of the aperture 36 when the shutter blades are in closing position. This alteration, however, varies the form and the relative position of the triangular or substantially triangular area 140 liberated by the shutter blades during the opening movement and requires different angles of rotation of the blade carrier 90.

It should be understood that the embodiments shown in the drawings and above described are by way of illustration only, and that I contemplate as within the scope of my invention all such forms and embodiments as may come within the scope of the claims.

What I claim is:

1. A photographic shutter comprising: shutter blades, a pivoted blade driving means for operating said shutter blades, a first spring connected to said blade driving means for returning same into its normal position to hold the shutter blades in closing position, a pivoted trigger, a second spring connected to said trigger for returning same into its normal inactive position, a spring pressed actuator, said actuator being movably connected with said trigger and being disengaged from said blade driving means when the trigger is in its normal inactive position, said actuator being adapted to be brought into engagement with said blade driving means, stationary means in the path of said actuator for causing a relative movement between the trigger and the actuator to tension the spring of said actuator during the movement of the trigger into active position, and means for releasing the spring pressed actuator for an engagement with the blade driving means so as to actuate same.

2. A photographic shutter comprising: shutter blades, a pivoted blade driving means for operating said shutter blades, a first spring connected to said blade driving means for returning same into its normal position to hold the shutter blades in closing position, a pivoted trigger, a second spring connected to said trigger for returning same into its normal inactive position, a spring pressed actuating lever, said actuating lever being hinged to said trigger at an eccentric point thereof and being disengaged from said blade driving means when the trigger is in its normal inactive position, said actuating lever being adapted to be brought into engagement with said blade driving means, means for providing joint movements of said trigger and actuating lever, stationary means in the path of said actuating lever for causing a relative movement between the trigger and the actuating lever to tension the spring of said actuating lever during the movement of the trigger into active position, and means for releasing the spring pressed actuating lever for an engagement with the blade driving means so as to actuate same.

3. A photographic shutter comprising: two interlocked shutter blades, a pivoted blade driving means for operating said shutter blades, a first spring connected to said blade driving means for returning same into its normal position to hold the shutter blades in closing position, a pivoted trigger, a second spring connected to said trigger for returning same into its normal inactive position, one of said shutter blades being swingably mounted on the pivot of the blade driving means, the other shutter blade being swingably mounted on the pivot of the trigger, a spring pressed actuating lever, said actuating lever being hinged to said trigger at an eccentric point thereof and being adapted to actuate said blade driving means, means for providing joint movements of said trigger and actuating lever, means for causing a relative movement between the trigger and the actuating lever to tension the spring of said actuating lever during the movement of the trigger into active position, and means for releasing the spring pressed actuating lever to actuate the blade driving means.

4. A photographic shutter comprising: shutter blades, a pivoted blade driving means for operating said shutter blades, a first spring connected to said blade driving means for returning same into its normal position to hold the shutter blades in closing position, a pivoted trigger, a second spring connected to said trigger for returning same into its normal inactive position, a spring pressed actuating lever, said actuating lever being hinged to said trigger at an eccentric point thereof, and being adapted to actuate said blade driving means, an abutment on said trigger, the spring of said actuating lever normally urging same against said abutment for providing joint movements of said trigger and said actuating lever, a post in the path of said actuating lever for moving away the actuating lever from the abutment of the trigger to tension the spring of the actuating lever during the movement of the trigger into active position, said eccentric arrangement of the actuating lever causing a disengagement of the actuating lever from the post at a predetermined moment during the movement of the trigger to release the spring pressed actuating lever for actuating the blade driving means, and means for lifting said actuating lever to pass over said post during the return movement of the trigger.

5. A photographic shutter comprising: shutter blades, a pivoted blade driving means for operating said shutter blades, a first spring connected to said blade driving means for returning same into its normal position to hold the shutter blades in closing position, a pivoted trigger, a second spring connected to said trigger for returning same into its normal inactive position, a spring pressed actuating lever, said actuating lever being hinged to said trigger at an eccentric point thereof and being adapted to actuate said blade driving means, a cam on said trigger for cooperation with said actuating lever to lift and lower same, an abutment on said trigger, the spring of said actuating lever pressing same against said cam and normally urging same against said abutment for providing joint movements of said trigger and said actuating lever, a post in the path of said actuating lever for moving away the actuating lever from the abutment of the trigger to tension the spring of the actuating lever and to cause a lowering of the actuating lever by said cam during the movement of the trigger into active position, said eccentric arrangement of the actuating lever causing a disengagement of the actuating lever from the post at a predetermined moment during the movement of the trigger to release the spring pressed actuating lever to actuate the blade driving means, and said cam lifting said actuating lever during the return movement of the trigger.

6. A photographic shutter comprising: shutter blades, a pivoted driving means for operating said shutter blades, a first spring connected to said blade driving means for returning same into its normal position to hold the shutter blades in closing position, a pivoted trigger, a second spring connected to said trigger for returning same into its normal inactive position, a spring pressed actuator, said actuator being movably connected with said trigger and being disengaged from said blade driving means when the trigger is in its normal inactive position, said actuator being adapted to be brought into engagement with said blade driving means, stationary means in the path of said actuator for causing a relative movement between the trigger and the actuator to tension the spring of said actuator during the movement of the trigger into active position, means for releasing the spring pressed actuator to engage and actuate the blade driving means, an adjustable setting mechanism for "bulb" and "instantaneous" exposures, stopping means associated with said adjustable setting mechanism, said stopping means being in a position for arresting the shutter mechanism prior to a disengagement of the actuator from the blade driving means when the setting mechanism is set for "bulb" exposure, and means for disengaging the actuator from the blade driving means during the return movement of the trigger.

7. A photographic shutter as claimed in claim 6, said shutter having means for disengaging the actuator from the blade driving means at the end of the movement of the trigger into active position, and said stopping means being in a position for permitting the disengagement of the actuator from the blade driving means at the end of the movement of the trigger into active position when the setting mechanism is set for "instantaneous" exposure.

8. A photographic shutter comprising: shutter blades, a pivoted blade driving means for operating said shutter blades, a first spring connected to said blade driving means for returning same into its normal position to hold the shutter blades in closing position, a pivoted trigger, a second spring connected to said trigger for returning same into its normal inactive position, a spring pressed actuator, said actuator being movably connected with said trigger and being disengaged from said blade driving means when the trigger is in its normal inactive position, said actuator being adapted to be brought into engagement with said blade driving means, stationary means in the path of said actuator for causing a relative movement between the trigger and the actuator to tension the spring of said actuator during the movement of the trigger into active position, means for releasing the spring pressed actuator to engage and actuate the blade driving means, an adjustable setting mechanism for "bulb" and "instantaneous" exposures, a stop arranged on said adjustable setting mechanism, said stop being in the path of said blade driving means when the setting mechanism is set for "bulb" exposure for arresting the shutter mechanism prior to the disengagement of the actuator from the blade driving means, and means for disengaging the actuator from the blade driving means during the return movement of the trigger.

9. A photographic shutter as claimed in claim 8, said stop being outside the path of said blade driving means when the setting mechanism is set for "instantaneous" exposure, and means for disengaging the actuator from the blade driving means at the end of the movement of the trigger into active position.

10. A photographic shutter comprising: shutter blades, a pivoted blade driving means for operating said shutter blades, a first spring connected to said blade driving means for returning same into its normal position to hold the shutter blades in closing position, a pivoted trigger, a second spring connected to said trigger for returning same into its normal inactive position, a spring pressed actuating lever, said actuating lever being hinged to said trigger at an eccentric point thereof and being adapted to actuate said blade driving means, a cam on said trigger, said cam cooperating with said actuating lever to lift and lower same, an abutment on said trigger, the spring of said actuating lever pressing same against said cam and normally urging same against said abutment for providing joint movements of said trigger and said actuating lever, a post in the path of said actuating lever for moving away the actuating lever from the abutment of the trigger to tension the spring of the actuating lever during the movement of the trigger into active position, said eccentric arrangement of the actuating lever causing a disengagement of the actuating lever from the post at a predetermined moment during the movement of the trigger to return the spring pressed actuating lever for engaging and actuating the blade driving means, an adjustable setting mechanism for "bulb" and "instantaneous" exposures, and stopping means associated with said adjustable setting mechanism, said stopping means being in a position for arresting the shutter mechanism prior to the disengagement of the actuating lever from the blade driving means when the setting mechanism is set for "bulb" exposure, and said cam lifting said actuating lever and disengaging same from the blade driving means during the return movement of the trigger.

11. A photographic shutter as claimed in claim 10, said eccentric arrangement of the actuating lever causing a disengagement of the actuating lever from the blade driving means at the end of the movement of the trigger into active position, said stopping means being in a position for permitting the disengagement of the actuating lever from the blade driving means at the end of the movement of the trigger into active position when the setting mechanism is set for "instantaneous" exposure, and means for lifting said actuating lever to pass over said post during the return movement of the trigger.

12. A photographic shutter as claimed in claim 10, said eccentric arrangement of the actuating lever causing a disengagement of the actuating lever from the blade driving means at the end of the movement of the trigger into active position, said stopping means being in a position for permitting the disengagement of the actuating lever from the blade driving means at the end of the movement of the trigger into active position when the setting mechanism is set for "instantaneous" exposure, the free end of said post having an inclined surface to guide said actuating lever over said post during the return movement of the trigger, and said cam lifting said actuating lever up to the lower level of said inclined surface.

ERIC STRASSENBURG.